UNITED STATES PATENT OFFICE.

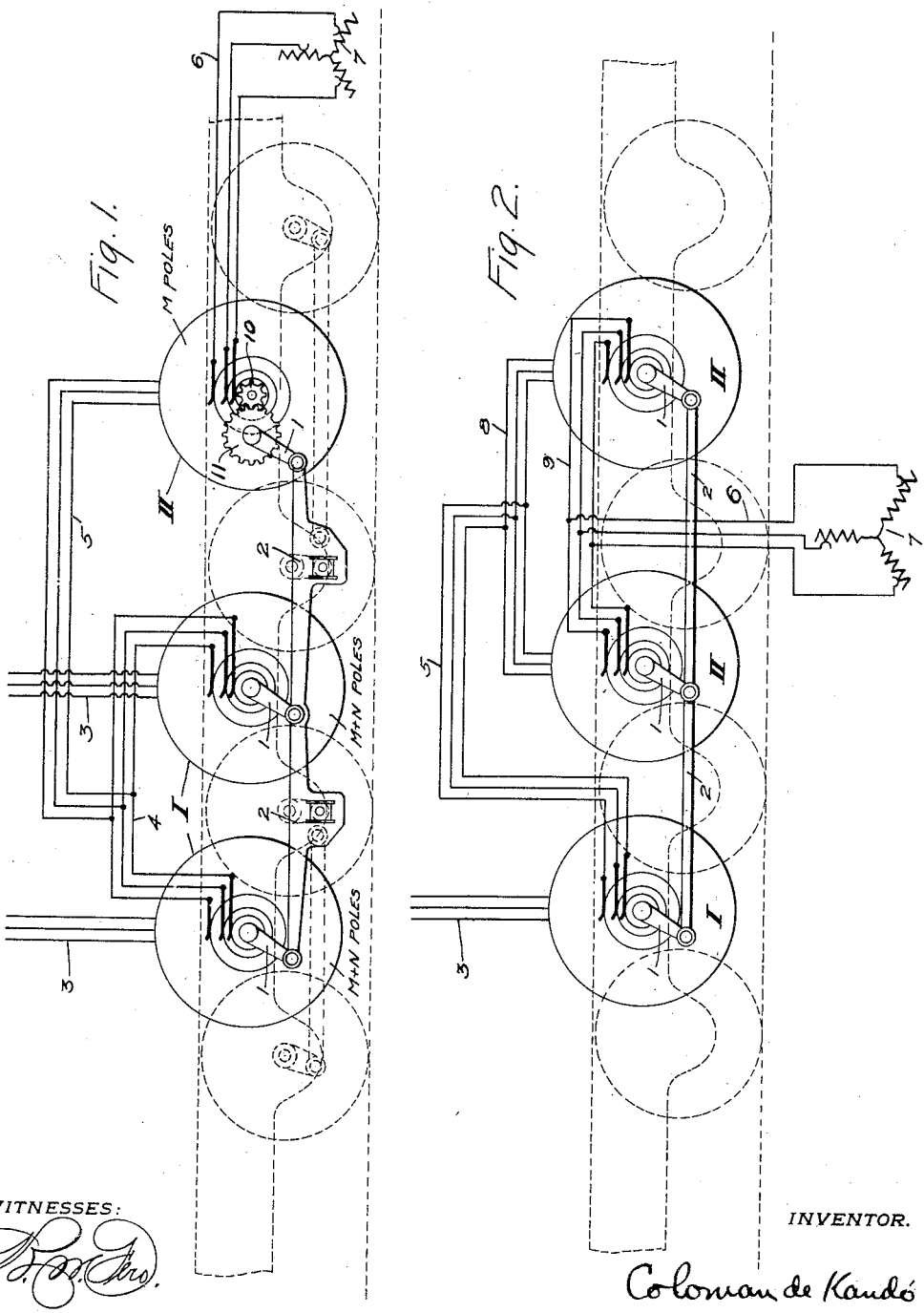

COLOMAN DE KANDÓ, OF BUDAPEST, HUNGARY, ASSIGNOR, BY MESNE ASSIGNMENTS, TO WESTINGHOUSE MACHINE COMPANY, A CORPORATION OF PENNSYLVANIA.

ELECTRIC MOTOR SYSTEM.

1,222,539. Specification of Letters Patent. Patented Apr. 10, 1917.

Application filed June 21, 1904, Serial No. 213,620. Renewed June 24, 1915. Serial No. 36,152.

*To all whom it may concern:*

Be it known that I, COLOMAN DE KANDÓ, engineer, a subject of the King of Hungary, residing at Budapest, in the Kingdom of Hungary, have invented certain new and useful Improvements in or Relating to Electric Motor Systems, of which the following is a specification.

In mounting electric motors for railway purposes the space available is generally limited, this space determining the extreme dimensions and therefore the power of the single motors which can be fitted. The limitation of space obviously determines the number of motors to be used for obtaining the desired power.

When what is known as "cascade" working is employed a different maximum power can be obtained in a given space according to how the capacity is divided between primary and secondary motors.

In "cascade" working as generally applied, it is however necessary to provide one primary motor for each secondary motor. This prevents proper utilization of the space available and makes the installation more expensive, as a greater number of motors has to be employed than would otherwise have been required.

The invention herein described relates to an arrangement whereby an unequal number of primary and secondary motors may be switched together in "cascade." The invention is illustrated as consisting of means for positively connecting the motors by means of suitable coupling gears such as coupling rods, tooth wheels and the like, or by mounting them on a common shaft in such manner that if the number of poles is the same for each of them they are forced to run at the same angular speed. If however the number of poles is different, the motors may run with angular speeds which are in inverted ratio to the number of poles, so that when several primary motors are used the secondary winding of these motors (and when several secondary motors are used both their primary and secondary windings) are switched in parallel to enable a smaller number of primary motors to be switched in "cascade" to a greater number of secondary motors or vice versa.

In the drawings Figures 1 and 2 are diagrammatical views illustrative of two different ways of carrying the invention into effect.

In the arrangement shown in Fig. 1 two primary motors I, I, are to be capable of being switched in "cascade" with one secondary motor II.

The rotating parts or "rotors" of all the motors are provided with cranks 1 connected together by rods 2, so that they rotate strictly in unison.

The field magnets of the motors I I are supplied with current through the wires 3, 3.

The armatures of these motors are switched in parallel by means of wires 4, and the wires 5 branching off from them lead to the field magnets of the motor II; the armature of the latter is connected to the regulating rheostat 7 by means of wires 6.

The primary motors I are provided with a greater number of poles than the secondary motor II, and consequently rotate at a lower speed. These motors are in mechanical connection with the motor II through the cranks 1 and connecting rod 2. The gear 10 on the motor II meshes with the gear 11 connected to the crank 1.

Fig. 2 shows, on the contrary, the method of switching one primary motor in "cascade" with two secondary ones. The motors are here also positively coupled by means of cranks and connecting rod 2, 2. The motor I is supplied with current by the wires 3. The field magnet windings of the motors II, II are switched in parallel by means of the wires 8 and are supplied with current from the armature of the motor I by means of the wires 5. The armature windings of the motors II, II are also connected in parallel by means of wires 6 branching off from the connecting wires 9.

It was well known that three phase motors coupled in cascade must be coupled mechanically if a substantially definite speed ratio is to be the result. This coupling however, will inevitably be employed since the object of cascade connection is to give more than one economical speed to a common load. For the purpose of cascade operation, as originally practised, it is sufficient in a case of motors for traction purposes to couple each motor to an axle of the vehicle, the wheels and rails serving as the mechanical connection between the motors. and while it is desirable that the wheels in this case should be of exactly the same size, it is not imperative.

When the rotor parts of several motors are connected in parallel as one member of a cascade group, a speed synchronizing coupling has another and entirely different function, and by speed synchronizing coupling is meant one other than through the axles, wheels and rails. It is not sufficient that the peripheral velocities should be alike, but it is indispensable that the parallel connected motors, (whether primary or secondary) should be coupled to one another in order that the several motors of the parallel set may preserve always absolutely the same instantaneous relation of rotor to stator windings. The reason for this is that the parallel connected secondary elements of the motors constituting one half of the cascade group may be regarded as in series with respect to one another, and will tend in series to get into opposition, that is to say, into short circuit relation, one with the other. If these motors are coupled to different axles, and there is the slightest difference in angular velocity this would be cumulative and would bring the motors into short circuited relation, thus destroying their operativeness. This speed synchronizing coupling which is emphasized in this invention, therefore, is the coupling of parallel connected motors with one another, since it is this speed synchronizing coupling which permits the operation of motors in parallel in cascade with other motors. This statement of course holds true where either the primary group (Fig. 1) or the secondary group (Fig. 2) in the cascade is made up of parallel connected motors.

When unequal numbers of motors are connected in cascade the torques of the motors are not necessarily alike. Thus in Fig. 1 the secondary motor II will have twice the torque of either primary motor. Similarly when motors having different numbers of poles are connected in cascade the torques will be different.

The switches required for the switching are not shown in the drawings.

It will, of course, be understood that the arrangement described can be applied to any number of motors.

Having now described and ascertained the nature of my said invention I declare that what I claim is:

1. The combination with the wheels of a vehicle, groups of motors, one group having a different number of motors from that of the other group, one group containing a primary induction motor, and another group containing a secondary induction motor, at least one group being composed of a plurality of motors having both their primaries and their secondaries connected in parallel, means for connecting the secondary of one group of motors with the primary of the other group, means for mounting the parallel connected motors, for mechanical connection, and means for positively coupling in fixed electrical angular relation the rotor parts of the parallel connected motors.

2. In combination with the wheels of a vehicle, primary and secondary induction motors, one group containing a primary motor, and another group containing a secondary motor, the groups being composed of different numbers of motors, at least one group being composed of a plurality of motors having both their primaries and their secondaries connected in parallel, means for connecting the secondary of one group of motors with the primary of the other group, and means for positively coupling in fixed electrical angular relation the rotor parts of the parallel connected motors.

3. In combination, a plurality of induction motors divided into two groups, each group containing a different number of motors, one group containing a primary induction motor, and the other containing a secondary induction motor, the motors of at least one group having their primaries and secondaries connected in parallel, means for connecting the secondary of one group with the primary of the other group, and means for positively coupling in fixed electrical angular relation the rotor parts of the parallel connected motors.

4. In combination with a group of primary induction motors having their primaries connected in parallel and their secondaries connected in parallel, a second group containing a smaller number of induction motors than is contained in the first mentioned group, means for connecting the secondary of the first mentioned group with the primary of the second group and means for positively coupling in fixed angular electrical relation the rotor parts of the motors of the first mentioned groups.

5. The combination with a plurality of induction motors having stator primaries connected in parallel and rotor secondaries connected in parallel and another induction motor having its primary connected to the secondaries of the first induction motors, of means for positively coupling the rotor parts of said first motors in fixed angular relation.

6. The combination with a plurality of induction motors having stator primaries connected in parallel and rotor secondaries connected in parallel and another induction motor having its primary connected to the secondaries of the first induction motors, of positive means for coupling all of the rotor parts in fixed angular relation.

7. In a vehicle, the combination with a plurality of induction driving motors severally having stator primaries connected in parallel and rotor secondaries connected in parallel, and means for positively coupling the rotors of said motors in fixed angular relation, of another induction driving motor comprising a stator primary and a rotor secondary, the stator primary being connected to the rotor secondaries of the first motors, and means for positively coupling the last driving motor to said first driving motors.

8. In a vehicle, the combination with a plurality of induction driving motors each comprising a stator primary and a rotor secondary, the stator primaries and the rotor secondaries of a portion of the driving motors being electrically connected in parallel-circuit relation, and the stator primary of the remaining driving motor being connected to the rotor secondaries of said portion of the driving motors, of means for positively coupling the rotor secondaries of said portion of said motors in fixed angular relation, and means associated with the rotor secondary of the last motor for regulating the operation of all of said motors.

9. The combination with groups of induction motors severally comprising different numbers of motors, the motors of the first group having their respective stator primaries and their respective rotor secondaries connected in multiple-circuit relation and to the stator primary of the second group, and means for positively coupling the rotor parts of the parallel-connected motors in fixed angular relation.

10. The combination with a plurality of groups of motors respectively comprising different numbers of motors, the stator primaries and the rotor secondaries of one of the groups of motors being respectively connected in parallel-circuit relation and means for connecting the rotor secondaries of said group of parallel-connected motors to the primary of the other group, of means for positively coupling the rotor secondaries of the group of parallel-connected motors in fixed electrical angular relation.

11. In a vehicle, the combination with a plurality of induction driving motors each comprising a stator primary and a rotor secondary, and means for electrically connecting the driving motors in cascade relation in two groups, the primary group comprising a plurality of the motors having their respective stator and rotor members connected in parallel-circuit relation, and the second group having its stator member connected to the rotor members of the first group, of means for positively coupling the motors of the first group in a fixed relation the one to the other.

12. The combination with a plurality of induction motors having primary and secondary members and adapted to work upon a common load and divided into two groups respectively comprising different numbers of motors, means for connecting the respective primary and secondary members of the group comprising the larger number of motors into parallel-circuit relation, and means for connecting the second group to the secondary members of the first group, of means for positively coupling the parallel-connected secondary members in a predetermined electrical angular relation.

13. In a vehicle, the combination with a plurality of induction driving motors severally comprising primary members and secondary members respectively electrically connected in multiple-circuit relation, and means for mechanically associating the secondary members in a fixed relation, of a single dynamo-electric machine connected to the secondary members of said parallel-connected motors, and means associated with said machine for affecting the operation of said motors.

In testimony whereof I have signed my name to this specification, in the presence of two subscribing witnesses.

COLOMAN DE KANDÓ.

Witnesses:
 FÀBRY FERENER,
 CHARLES E. BALCZO.